June 6, 1944. H. JDE 2,350,896
SUPER CHARGER REGULATOR FOR AIRPLANE CABINS
Filed June 25, 1940
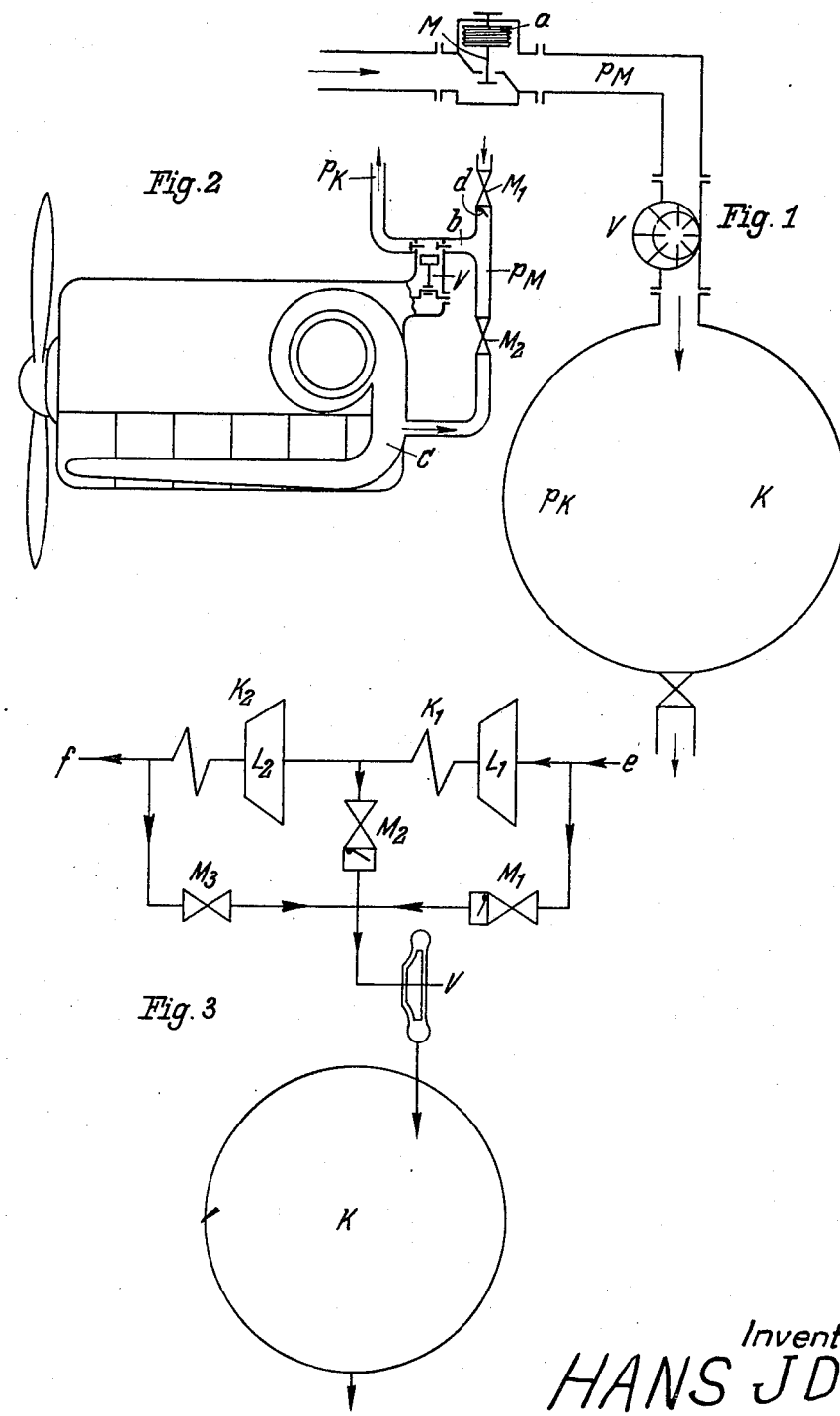
Inventor:
HANS JDE
BY HIS ATTORNEYS
Howson and Howson

UNITED STATES PATENT OFFICE 2,350,896

SUPERCHARGER-REGULATOR FOR AIRPLANE CABINS

Hans Jde, Falkenberg, near Grunau, Germany; vested in the Alien Property Custodian Application June 25, 1940, Serial No. 342,342
In Germany February 15, 1939

6 Claims. (Cl. 230—30)

It is known to provide altitude airplanes with super-pressure cabins and supply the latter with fresh breathing air, which is under a higher pressure than that of the atmosphere. It is also known to branch off the air for the cabins from the charging air conduit of the motor and to keep constant the absolute pressure within the cabin through pressure maintaining valves which act independently of the altitude. In order to obtain also a permanent supply of air under flying conditions in which the charging pressure will drop below the pressure in the cabin (gliding, reaching the height at culmination) an additional compressor must be arranged between the conduit for the charging air and the cabin.

When employing gyroscope compressors as compressing means for the breathing air it is furthermore known to control the quantity of air through throttling at the suction side in dependency on the air pressure in the cabin. A further possibility of control now would consist in operating said compressor for the air in the cabin only upon requirement, which would make necessary the provision of various operating or controlling members respectively.

The present invention relates to a simple means of automatically bridging the various conditions of operation, through which any mechanical difficulty is avoided and no supervision is required. The additional pump, supplying the breathing air to the cabin, is constantly driven by the motor of the airplane.

As the motor of the airplane will mainly run at a constant number of revolutions, the air compressor for the cabin will induce a constant volume of air. When maintaining a constant inducing pressure and a constant inducing temperature the compressor would thus insure a constant supply of air at all altitudes of flying.

A mode of realisation of the invention is shown in the drawing by way of example and it is Figure 1 a diagram of the arrangement for supplying air to the cabin, and Figure 2 shows a modification thereof.

Figure 3 is another modification.

Referring to Figure 1, M represents a pressure reducing valve by which with the aid of an evacuated spring bellows $a$ the inducing pressure is maintained constant at all altitudes. The air compressor V for the cabin compresses the induced air in the relation $P_M:P_K$ and conveys the air into the pressure proof cabin K of the altitude airplane, just according to the selected relation of compression or admissible for the compressor, either directly or by way of an air cooling device.

If the pressure reducing valve takes the breathing air from the atmosphere, the induced weight of the air at a constant number of revolutions of the compressor and at a constant inducing pressure will be determined by the temperature of the outside air.

For operative and technical reasons the supposed amount of the pressure of the air in the cabin K is suitably adjusted to somewhat below 1 atmosphere, for instance to 0.8 atmosphere.

In that instance two unfavorable conditions of operation may occur for the compressor of the cabin air, in which the admissible relation of compression is exceeded, namely, firstly at the ground, where on the suction side the adjusted supposed value is present, while as counter-pressure the outside atmosphere will act, and secondly when flying at an altitude, where the supposed value in the cabin is maintained, while the pressure of the outside atmosphere lies below the supposed value $P_M$ adjusted in the pressure reducing valve.

In order to be able to utilize at every altitude fully the pressure relation admissible for the compressor of the cabin air, the present invention provides for the first instance, to evacuate the spring bellows $a$ only partly for the purpose of attaining by this step a sensibility of the valve to the temperature. In conseqeunce, near the ground there will be adjusted automatically a higher inducing pressure than in the colder atmosphere in great altitudes. Through a suitable dosing of the volume of air within the spring bellows it is possible to operate the compressor at about the same relation of pressure both at altitudes and also on the ground.

In the second instance, represented in Figure 2 there is provided according to the invention still another pressure reducing valve $M_2$ in the inducing conduit $b$ of the compressor of the cabin air, which valve will effect a connection with the pressure conduit $c$ of the charging device for the motor of the airplane, when the adjusted inducing pressure $P_M$ is dropping below the normal. Now the charging air is reduced to the adjusted inducing pressure $P_M$ by means of the pressure reducing valve $M_2$ and the pressure reducing valve $M_1$ is closed by means of a nonreturn valve $d$. Through this arrangement of the said two pressure reducing valves brought to accord, an automatic control of the taking in of air from the atmosphere or from the conduit of the charging air is insured. In the limit case, where the pressure $P_M$ is chosen approximately equal to the pressure on the ground, the pressure reducing valve M₁ would be fully opened at all altitudes, so that accordingly the provision of said valve may be dispensed with and only the nonreturn valve would be present.

If it is intended to reach very great altitudes multi-stage charging devices will be used and accordingly a plurality of pressure reducing valves may be provided which are brought in accord in such a manner, that at all times, the correct pressure stage of the charging aggregate is tapped for the supply of the breathing air. In Figure 3, for instance, there are provided two charging stages L₁ and L₂ with their air coolers K₁ and K₂, which will supply the charging air for the motor of the airplane. The air is induced at e from the free atmosphere and conveyed into the motor at f. In the exhaust conduit of the compressor V for the cabin air are provided three pressure reducing valves (not shown) which are effective to reduce the pressure of the air discharged from the cabin from the pressure maintained within the cabin to the pressure of the surrounding atmosphere which in turn depends upon the altitude.

I claim:

1. In a controlling mechanism for the supply of air to the air tight cabins in aircraft, a compressor supplying air to the cabin, a pressure reducing valve controlling the pressure in the suction line of the compressor, and a partly evacuated spring bellows in said suction line and responsive to the pressure therein and connected to said valve for actuating the same.

2. In a controlling mechanism for the supply of air to the air tight cabins in aircraft, a compressor for charging air to the motor, an additional compressor supplying air to the cabin, a pressure reducing valve controlling the pressure in the suction line of the cabin air compressor, means responsive to the pressure in said suction line for actuating said valve, a second pressure reducing valve in the pressure line from said motor charging air compressor, and means responsive to decrease in pressure in said cabin air compressor suction line for actuating said second pressure reducing vlave.

3. In a controlling mechanism for the supply of air to the air tight cabins in aircraft, a motor charging air compressor, a cabin breathing air compressor, a pressure reducing valve controlling the pressure in the suction line of the cabin air compressor, means responsive to the pressure in said suction line for actuating said valve, a second pressure reducing valve in the pressure line from said motor charging air compressor, means responsive to decrease in pressure in said cabin air compressor suction line for actuating said second pressure reducing valve, and a non-return valve between said cabin air compressor suction line and said first mentioned pressure reducing valve.

4. In a controlling mechanism for the supply of air to the air tight cabins in aircraft, a compressor supplying air to the cabin, a multi-stage motor charging air compressor, pressure reducing valves in the lines connecting the pressure side of each stage to the suction side of said cabin air compressor, said pressure reducing valves being constructed and arranged to automatically tap the correct pressure stage of the multi stage compressor for supplying breathing air to the suction side of said cabin air compressor.

5. In an altitude aircraft having a supercharged motor and a pressureproof cabin, a compressor driven by said motor, and having an exhaust conduit connected to said cabin for supplying breathing air thereto, said compressor having an inlet conduit connected to a variable pressure source of air, a pressure reducing valve in said inlet conduit, means responsive to reduced pressure in said conduit for actuating said valve, in combination with a second pressure reducing valve in said conduit and connected to the pressure conduit of the charging air for said motor, and responsive to further reduced pressure in said compressor inlet conduit.

6. In an altitude aircraft having a motor supercharged in stages and a pressureproof cabin, a compressor driven by said motor at constant speed and having an exhaust conduit connected to said cabin for supplying breathing air thereto, said compressor having a branched inlet conduit connected to the stages of air supply for said motor, in combination with pressure reducing valves in said conduit branches and responsive to predetermined pressures.

HANS JDE.